Patented Mar. 15, 1932

1,849,526

UNITED STATES PATENT OFFICE

GUSTAF HENRIK HULTMAN, OF STOCKHOLM, SWEDEN

PROCESS FOR PURIFYING COAL GAS FROM HYDROGEN SULPHIDE

No Drawing. Application filed June 27, 1928, Serial No. 288,798, and in Sweden January 14, 1926.

It is well known that coal gas can be purified from hydrogen sulphide by washing the coal gas containing hydrogen sulphide with a solution of non-volatile alkali carbonate, when a solution is obtained containing non-volatile alkali bicarbonate and non-volatile alkali hydrosulphide, as per

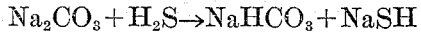
$$Na_2CO_3 + H_2S \rightarrow NaHCO_3 + NaSH$$

If air is forced through the solution obtained, the hydrogen sulphide is carried off by the current of air, and the solution of non-volatile alkali carbonate is recovered for renewed recovery of hydrogen sulphide. The hydrogen sulphide content in the air current is, however, too small for enabling the hydrogen sulphide in the same being exploited or utilized, and too large for being released into the atmosphere in populous districts. It is alleged to amount to about 0,3 volume per cent. The process therefore only found a limited use. It is also known to take up the solution obtained in the washing process in an evacuated vessel and evacuate the hydrogen sulphide, in which process the solution of non-volatile alkali carbonate is again obtained for renewed recovery of the hydrogen sulphide. In this process it has been considered necessary to heat the solution in the evacuated vessel to a comparatively high temperature in order to obtain in the evacuation process the largest possible quantity of hydrogen sulphide. This comparatively high temperature has, however, entailed the fact that one has been obliged to make special arrangements for cooling the recovered solution of non-volatile alkali carbonate to a temperature suitable for renewed washing of the coal gas.

According to the present invention the solution in the evacuated vessel is kept only at such a temperature that the solution of non-volatile alkali carbonate recovered has a temperature suitable for renewed recovery of the hydrogen sulphide, and need thus not be subjected to any cooling processes, inasmuch as the inventor has found that at such temperature the recovery of hydrogen sulphide is particularly effective. The apparatuses necessary for carrying out the process are thus extremely simple.

The invention can be carried into effect by way of example in the following manner. In an ordinary coal gas washer, upright or recumbent, the gas containing hydrogen sulphide is washed with a 3% sodium carbonate solution. The solution obtained in this process is put into an evacuated vessel, which at the top may be provided with a condenser device, whose task it is to condense the accompanying steam, which would otherwise unnecessarily augment the volume of gas recovered. The operation may be continuous, so that consequently the solution from the washer is continuously sucked into, and the treated solution thereupon continously pumped out of, the evacuated vessel. At 730 mm. vacuum and a temperature of about 30° C. in the solution, 98% of recovery of hydrogen sulphide has been reached. It will be obvious to those skilled in the art that by maintaining the solution under such high vacuum, boiling will take place even at the low temperature of 30° C.

The hydrogen sulphide obtained in a concentrated form may be utilized according to known methods. It can consequently be combusted with the necessary quantity of air into sulphur in a Claus' kiln, or converted into sulphur by means of sulphurous acid and a suitable salt solution. The sulphurous acid can be obtained by combustion of some of the hydrogen sulphide. By combustion can also be obtained sulphurous acid for the manufacture of sulphuric acid.

I claim :—

1. The process of purifying coal gas from hydrogen sulphide which consists in washing the gas with a solution of non-volatile alkali carbonate thereby to obtain alkali bicarbonate and non-volatile alkali hydrosulphide in solution, charging the solution into an evacuated vessel, and maintaining said vessel under a vacuum of approximately 730 mm. thereby to cause boiling of the solution at a temperature of approximately 30° C.

2. The process of purifying coal gas from hydrogen sulphide which consists in washing the gas with a sodium carbonate solution thereby to obtain sodium bicarbonate and sodium hydrosulphide in solution, charging the resulting solution into an evacuated vessel, and maintaining said vessel under a vacuum of approximately 730 mm. thereby to cause boiling of the solution at a temperature of approximately 30° C.

3. The process of purifying coal gas from hydrogen sulphide which consists in washing the gas with a potassium carbonate solution thereby to obtain potassium bicarbonate and potassium hydrosulphide in solution, charging the resulting solution into an evacuated vessel, and maintaining said vessel under a vacuum of approximately 730 mm. thereby to cause boiling of the solution at a temperature of approximately 30° C.

In testimony whereof I have signed my name to this specification.

GUSTAF HENRIK HULTMAN.